(12) United States Patent
Shapira (10) Patent No.: US 6,327,547 B1
(45) Date of Patent: Dec. 4, 2001

(54) METHOD FOR COUNTING THE NUMBER OF PEOPLE CROSSING AN ENTRY BARRIER

(76) Inventor: Aharon Shapira, 27 Kaufman St., Haifa 34780 (IL)

( * ) Notice: Subject to any disclaimer, the term of this patent is extended or adjusted under 35 U.S.C. 154(b) by 0 days.

(21) Appl. No.: 09/180,434

(22) PCT Filed: Mar. 6, 1998

(86) PCT No.: PCT/IL98/00110

§ 371 Date: Nov. 9, 1998

§ 102(e) Date: Nov. 9, 1998

(87) PCT Pub. No.: WO98/40719

PCT Pub. Date: Sep. 17, 1998

(30) Foreign Application Priority Data

Mar. 10, 1997 (IL) ........................................................ 120408

(51) Int. Cl.$^7$ ...................................................... G07C 9/00
(52) U.S. Cl. ................................. 702/128; 377/5; 377/6; 377/45
(58) Field of Search ........................... 702/128; 235/98 R, 235/98 B, 99 R; 377/5, 6, 45, 24.2, 130; 73/172

(56) References Cited

U.S. PATENT DOCUMENTS

| 4,223,887 | 9/1980 | Holtz . |
| 4,303,851 | 12/1981 | Mottier ................................... 235/92 |
| 5,656,801 | 8/1997 | Goren et al. ........................ 235/98 R |

FOREIGN PATENT DOCUMENTS

9702474  1/1997  (WO) .

*Primary Examiner*—Kamini Shah (57) ABSTRACT

A method for counting a number of objects passing through an entry threshold, comprising the steps of disposing a sensor (11) having a matrix of sensing points in an area of the entry threshold, identifying successive complete footprints of the same object on the sensor, and distinguishing between different footprints using clustering. The method is used in association with a pressure mat disposed at the entry threshold and tracks the progress of the object across the mat. Specifically, when a footprint vanishes from the mat, retroactive processing is effected in respect of the body associated with that footprint so that other footprints belonging to the same body may be ignored. The number of footprints thus associated with the body and which are not ignored serves as a counter of the number of bodies crossing the entry threshold.

17 Claims, 8 Drawing Sheets

METHOD FOR COUNTING THE NUMBER OF PEOPLE CROSSING AN ENTRY BARRIER

FIELD OF THE INVENTION

This invention relates to a method and system for estimating an number of objects effecting dynamic contact with a confined area of floor space. In particular, the invention finds application for estimating the number of occupants in a confined area such as a store, public transport and the like.

BACKGROUND OF THE INVENTION

Various prior art proposals exist for estimating a number of occupants in a confined spaces such as, for example, an elevator, store and so on. For example, in International Publication No. WO 97/02474, there is proposed an improved method based on the use of a matrix of pressure contacts for estimating an actual occupied area of floor in a confined space. Pressure contact points are clustered so as to form composite areas of floor which are occupied and a boundary is provided around each of these areas in order to allow for minimum breathing space between adjacent passengers. On this basis, the total occupied area may be estimated. However, such a method still does not give an accurate estimation of the actual number of passengers in the elevator because the footprints of two passengers standing in very close proximity will be so close that they are clustered together and, to all intents and purposes, are treated as a single footprint. This, of course, does not matter when only occupied or free area in a confined space is of interest. However, it is critical when an actual number of occupants is to be estimated.

This having been said, there is a fundamental difference between, on the one hand, the situation where people are static in a confined space and, on the other hand, when people are moving across a confined space so as to effect dynamic contact therewith. In the static case, for example in an elevator car, as more people are confined into the limited space thereof, their feet inevitably are brought into ever closer proximity. Eventually, it becomes impossible to determine whether adjacent pressure contact points belong to the same footprint or to the adjacent footprints of two people standing almost on top of one another. As noted, this does not matter where an estimation of occupied floor space is all that is required, but it clearly militates against an accurate estimation of the number of occupants.

However, in the second, dynamic case, where people are constantly on the move and where they effect only transient contact with the sensor, the likelihood that two different people in close proximity will exert pressure on the sensor simultaneously is so slim as to be safely negligible. This means that, contrary to the static case discussed above, each distinct cluster of pressure points may be identified with a unique instance of a person making his way across the sensor.

SUMMARY OF THE INVENTION

It is an object of the invention to provide a method and system for estimating a number of objects effecting transient contact with a floor area.

According to a broad aspect of the invention there is provided a method for counting a number of objects passing through an entry threshold, the method comprising:

(a) disposing a sensor having a matrix of sensing points in an area of the entry threshold, (b) identifying successive complete footprints of the same object on said sensor, and (c) distinguishing between different footprints using clustering.

Thus, in accordance with the invention a sensor is employed for registering objects entering and leaving an entry threshold it being assumed, as noted above, that two or more people will not be so close on the trail of one another that their respective footprints make virtually simultaneous and contiguous contact with the sensor.

The method according to the invention also allows for wheeled objects such as baby carriages and wheel chairs to be counted as well as objects dragged across the sensor such as, for instance, a piece of luggage and the like.

BRIEF DESCRIPTION OF THE DRAWINGS

In order to understand the invention and to see how it may be carried out in practice, some preferred embodiments relating to the estimation of a number of people and of a wheel object in a store will now be described, by way of non-limiting example only, with reference to the accompanying drawings, in which:

FIGS. 2a to 2h are pictorial representations of successive pressure contact points associated with the temporal evolution of a footprint;

DETAILED DESCRIPTION OF PREFERRED EMBODIMENTS

Figure 1:
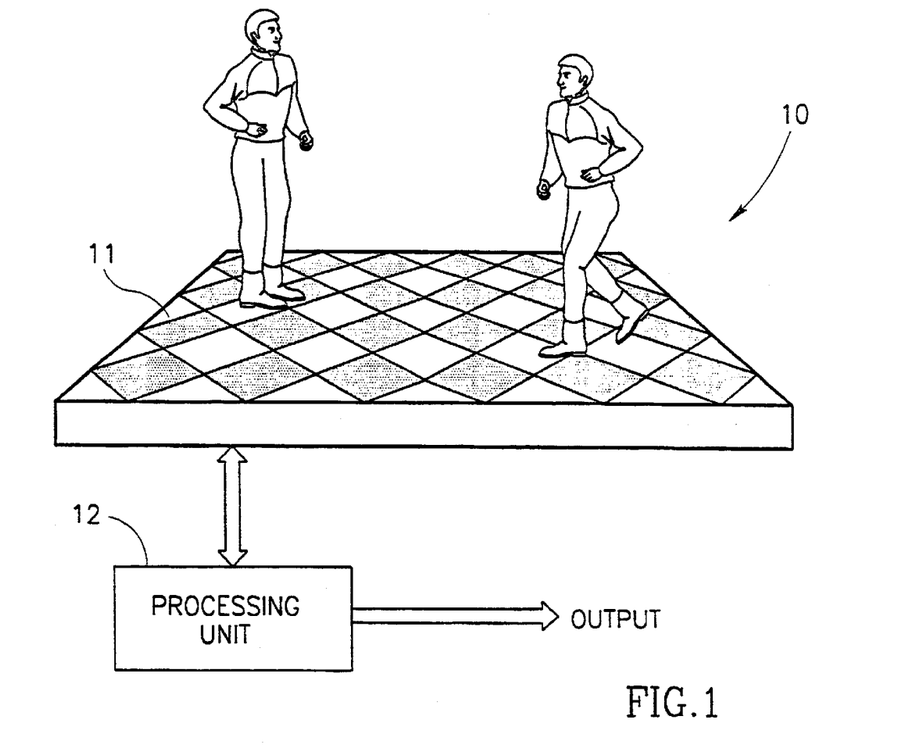
FIG. 1 is a schematic view of a system according to the invention.

FIG. 1 is a schematic view of a system 10 according to the invention comprising a sensor 11 coupled to a processing unit 12 for counting a number of people 13 or other objects traversing the sensor 11. The sensor 11 is of similar form to that described in International Publication No. WO 97/02474, comprising a matrix of pressure contacts. The length of the sensor 11 must be such as to guarantee that a person walking across a floor area on which the sensor is located must inevitably tread fully on the sensor. On the other hand, in the interest of economy there is nothing to be gained by making the sensor 11 unnecessarily long.

The process of generating pressure contact with the floor area is dynamic. Initially a person brings his heel into pressure contact with the floor and the tip of the heel then serves as a hinge axis for subsequent rotation of the shoe until fill contact is achieved. Full contact is maintained for a short time, whereafter the sole serves as a new hinge axis for subsequent rotation of the shoe. During such movement, only partial pressure contact of the shoe is achieved until the foot is lifted altogether from the floor and no pressure contact therewith is produced. Each footprint is characterized by its corresponding contact points creating a so-called "cluster".

Figure 2:
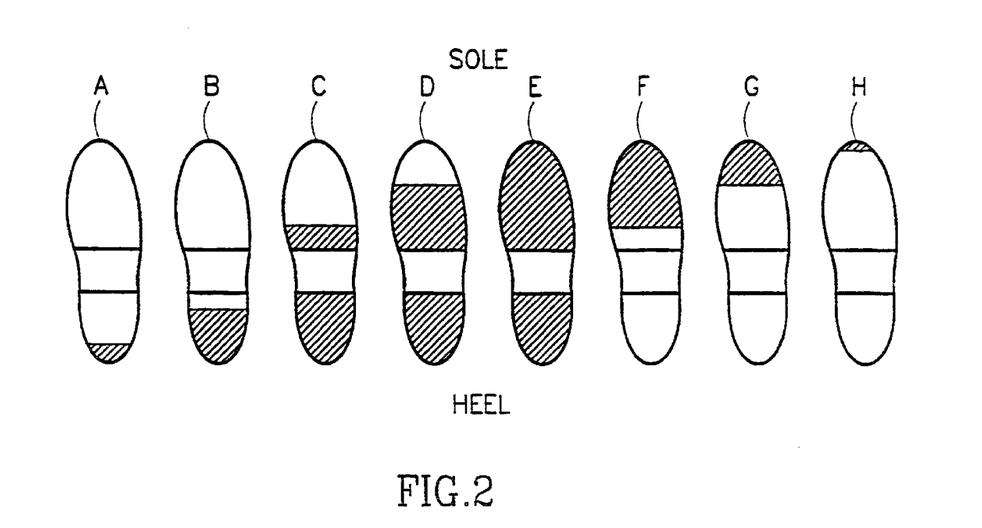

FIGS. 2a to 2h show subsequent stages during the evolution of a complete footprint. In FIG. 2a only the tip of the heel is in contact with the floor. In FIG. 2b, still only the heel is in partial, albeit greater, contact with the floor. In FIG. 2c the heel is in complete contact with the floor and part of the sole has started to make contact therewith. In FIGS. 2d and 2e, the sole continues to effect greater contact until, in FIG. 2e, the footprint effects complete contact with the floor. FIGS. 2f to 2h show subsequent stages during which the heel is lifted and the sole makes progressively less contact with the floor until it disappears altogether.

Figure 3A:
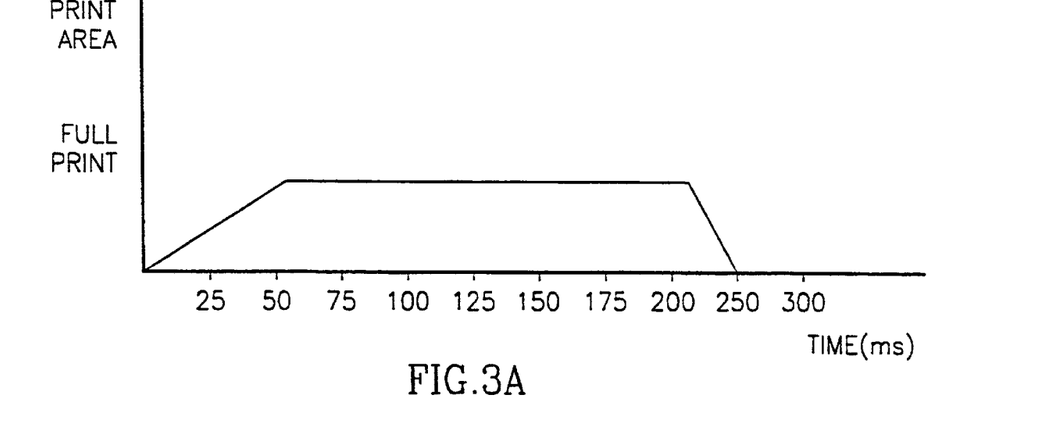
FIG. 3 is a graphic representation of heel and sole portions of a footprint during the temporal evolution thereof.
Figure 3B:
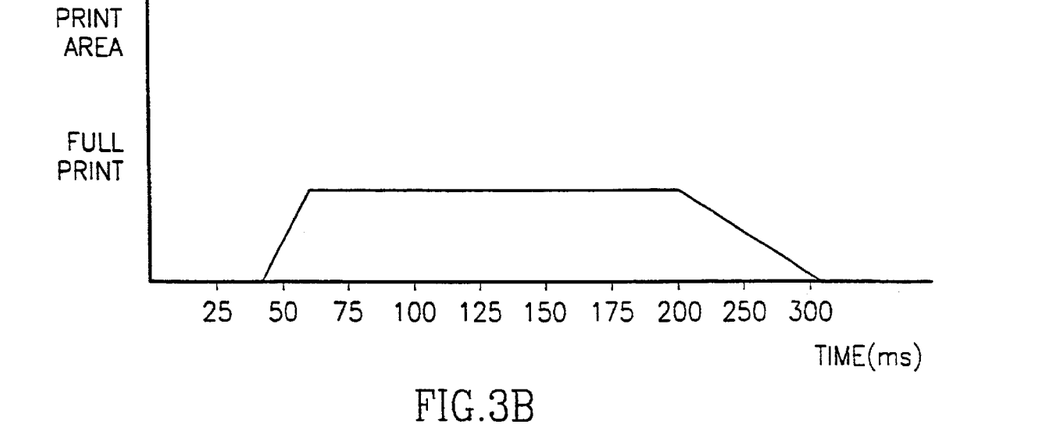

FIGS. 3a and 3b show the dynamic evolution of the pressure profiles generated by contact of the heel and sole from creation to disappearance of a footprint. It is shown that the creation of a new footprint is heralded by the heel starting to make contact whilst pressure contact with the sole only follows later. An overlapping time period of approximately 130 ms corresponds to full pressure contact of the complete footprint.

Figure 4A:
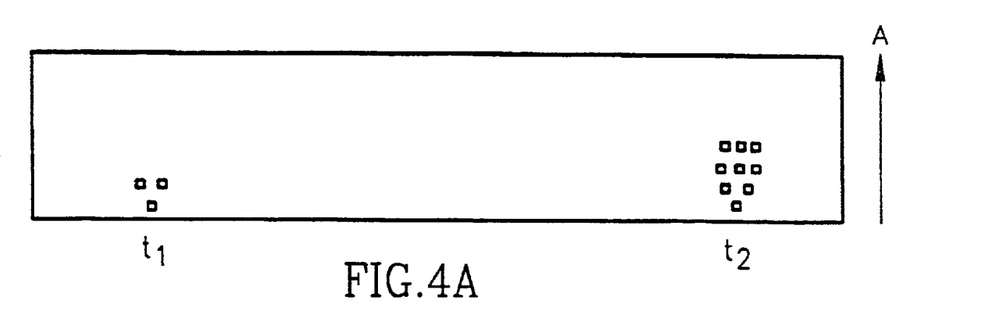
FIG. 4 shows schematically how the temporal evolution of a footprint may be used to indicate a direction of passage across the sensor.
Figure 4B:
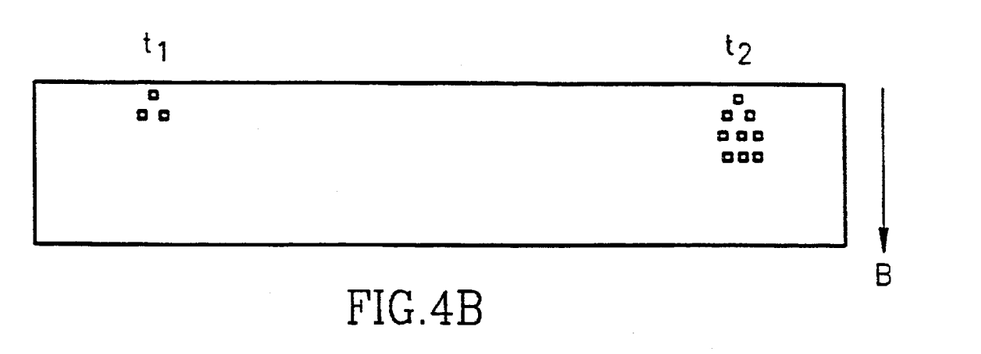

FIGS. 4a and 4b illustrate how it is thus possible to determine the direction of passage across the floor area. In FIG. 4a, at a time $t_1$ four pressure contact points are detected corresponding to initial contact with the heel. At a subsequent time $t_2$, further pressure contact points are detected corresponding to an increased area of pressure contact. Thus, evolution of the pressure profile occurs in the direction of arrow A which is thus the direction of passage across the sensor. In FIG. 4b, the opposite is the case, evolution of the pressure profile occurring in the direction of arrow B which is thus the direction of passage across the sensor.

Contact points are sampled continuously at a fixed sampling rate, typically in the order of 25 ms so as to generate successive samples $S_i$ each being a bitmap of contact points. From each such sample $S_i$ those contact points which are also present in the previous sample $S_{i-}$ are disregarded. This is done by logical ANDing the respective bit-maps corresponding to successive samples $S_i$ and $S_{i-}$ and subtracting the result from the present sample $S_i$. Thus for each sample $S_i$ the fresh contact points $F_i$ which are sensed for the first time are given by $F_i = S_{i-(Si \wedge S_{i-1})}$. A time of creation $t_{fi}$ is associated with each fresh contact point $F_i$ so as to enable its direction of evolution to be determined as explained above with reference to FIG. 4. The fresh contact point $F_i$ may belong to an existing footprint or may be the first occurrence of a new footprint. In practice, footprints themselves are not detected: rather pressure contact points are sensed, each corresponding to a respective footprint, and the pressure contact points are then analyzed in order to associate them with different footprints. This analysis is called "clustering" since different clusters of contact points are associated with respective footprints. A cluster representing a footprint in complete contact with the sensor is termed a "maximum contact cluster".

It is to be noted that throughout this specification and claims, the term "footprint" is to be understood in its most general definition of a contour produced by contact of an object with the sensor. If the object is a person, then the footprint corresponds to the outline of the person's foot or foot apparel. However, in the general case, where other objects are concerned, the footprint is merely the outline which it impresses on the sensor.

Figure 5:
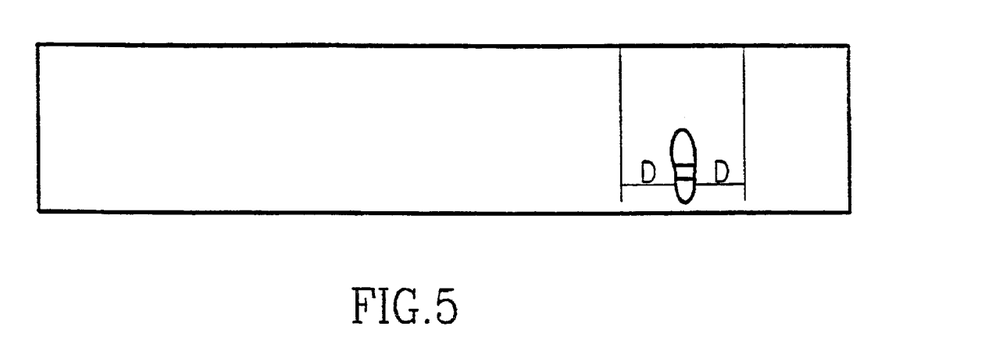
FIG. 5 shows schematically the definition of a boundary around a footprint of an object for associating successive footprints with the same object.
Figure 6:
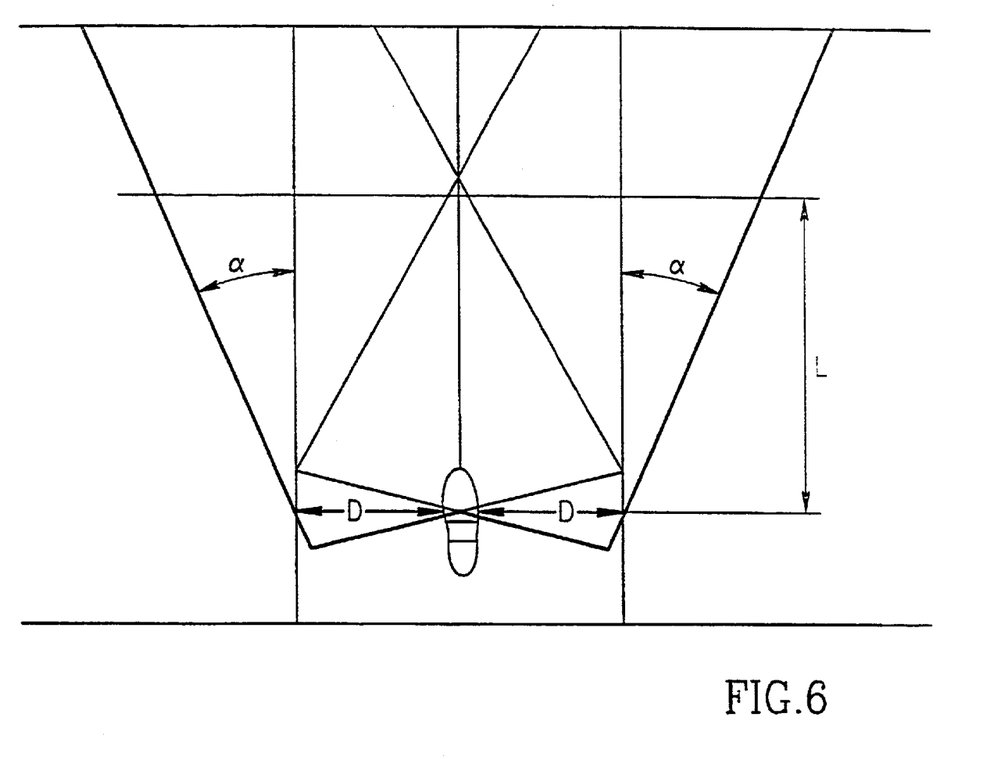
FIG. 6 shows schematically an extension of the boundary definition shown in FIG. 5 for accommodating non-direct passage of an object across the sensor.

When a footprint is first detected, it is not possible with foresight to know whether it corresponds to a left foot or to a right foot. Consequently, the next footprint of the same person could be either to the left or to the right of the first footprint. FIG. 5 shows schematically the need to define a boundary extending a distance D either side of an existing footprint within which a successive footprint of the same person may reasonably be expected to fall. In fact, although a person crossing an entry threshold may be expected to walk in the general direction towards or away from the entry threshold, in practice some angular deviation from a direct passage across the sensor 11 must be allowed for. FIG. 6 shows an allowed deviation of an angle a from the direct passage giving rise to a boundary having a generally W-shaped contour within which a successive footprint of the same person may legitimately fall. The extent L of the W-contour must be sufficiently long relative to a person's stride so as to accommodate the person's successive footprint; but also sufficiently short so as to ensure that a successive footprint matching that which gave rise to the W-contour may be assumed to be a successive instance of the same person.

Clearly, the object of the invention is to count objects or people not footprints. To this end, for every legitimate footprint, a decision must be made as to whether the footprint is a successive footprint of an already known footprint of a person or, to the contrary, is the first footprint of a person crossing the sensor. At the rudimentary decision level, a legitimate footprint which falls within the W-contour can be considered as a successive instance of the footprint which gave rise to the W-contour. Although a footprint which falls within the W-contour has a high probability of being a successive instance of the footprint which gave rise to the W-contour, it need not be so.

Therefore, in order to reduce the likelihood of a false decision, the direction of passage of a footprint falling within the W-contour is compared to the direction of passage of the footprint which gave rise to the same W-contour. Only if the direction of passage of both footprints is identical will they be associated with the same person.

In order to enhance even further the reliability of the decision, differentiation between footprints is effected by comparing their contact areas. Thus, a footprint which falls within a W-contour will be considered a successive footprint only if its contact area is substantially equal to the contact area of the footprint which gave rise to the W-contour. The number of sensor points in each footprint is indicative of contact area and thus those footprints which are within a reasonable span of one another and have essentially the same number of pressure contact points may be taken to belong to the same object.

Figure 7:
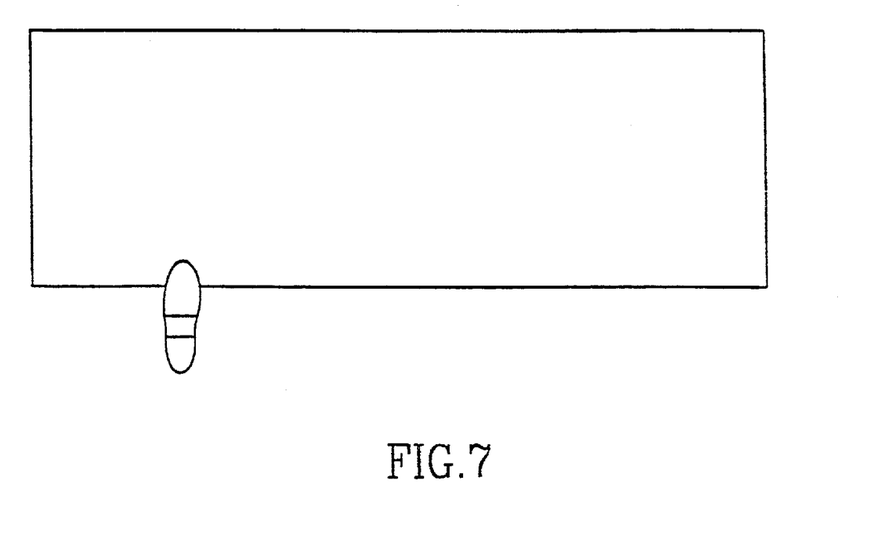
FIG. 7 shows schematically a partial footprint which must be disregarded in accordance with the method of the invention.

Such an approach requires that only full contact footprints be compared with each other and, specifically, that partial footprints as shown in FIG. 7 caused when a person first steps on the sensor, for example, be discarded. Were this not done, then such a partial footprint would have no match with any other full contact footprint of the same person and would thus be counted as a different person. This would therefore give rise to a estimated number of objects or people higher than the correct value.

Figure 8:
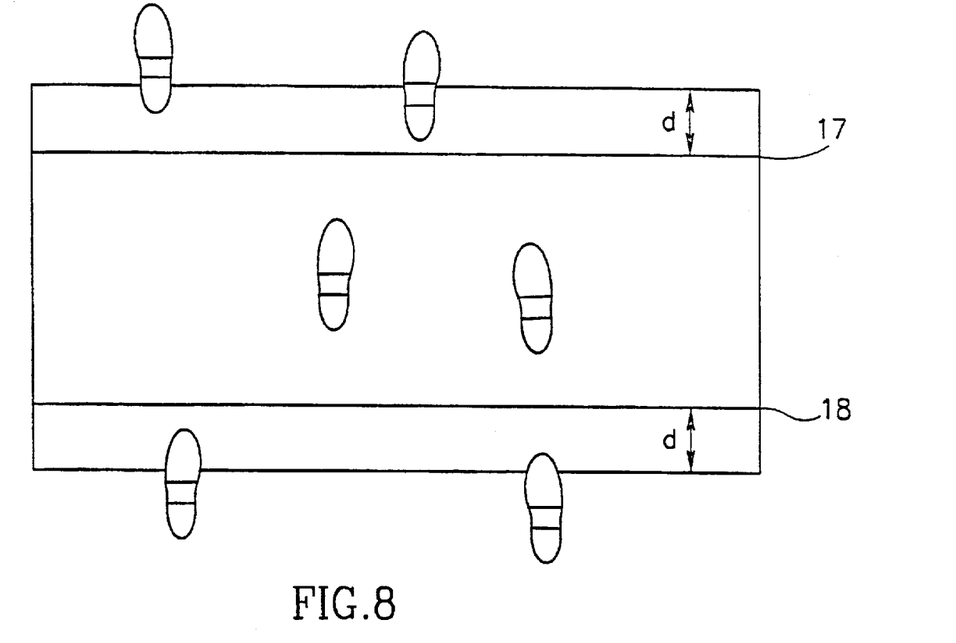
FIG. 8 illustrates pictorially the use of margins at opposite extremities of the sensor for determining whether a footprint is partial.

FIG. 8 shows how partial footprints may be discarded. At opposite extremities 15 and 16 of the sensor 11, there are defined "dead" areas each having a width d within imaginary margins 17 and 18. Any footprint which is wholly or partially within only one of the dead areas is ignored.

Likewise, any discrete footprints whose contact area does not correspond to a person but does not correspond to an object which is rolled or dragged along the sensor are disregarded. By such means, a person crossing the floor area with a dog on a lead will be counted; but the dog itself will be ignored.

Figure 9A:
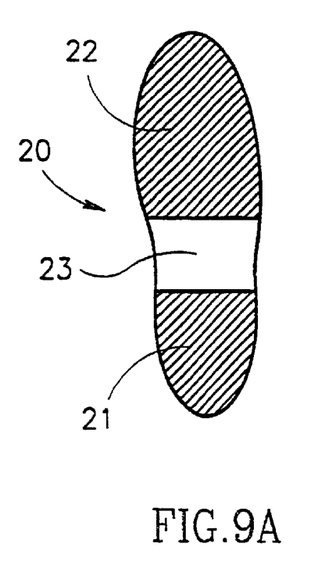
FIGS. 9a, 9b and 9c show different maximum contact clusters each representing a respective type of footprint.
Figure 9B:
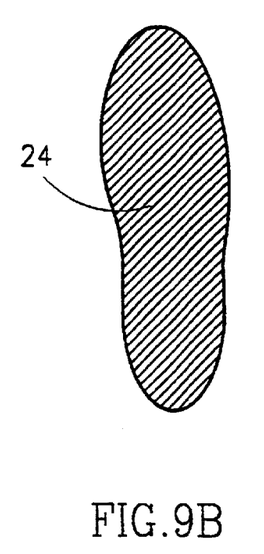
Figure 9C:
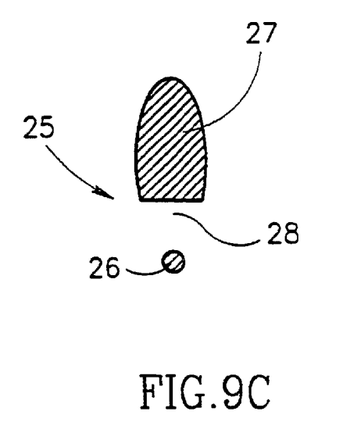

It is apparent that not all footprints are continuous. FIG. 9a shows pictorially a man's shoe 20 having a heel portion 21 and a sole portion 22 both of which make pressure contact with the sensor; and a central bridge portion 23 which makes no contact with the sensor. FIG. 9b shows pictorially a flat sports shoe 24 which makes complete contact with the sensor. FIG. 9c shows pictorially a woman's stiletto shoe 25 having a narrow heel portion 26 and a sole portion 27 both of which make pressure contact with the sensor; and a central bridge portion 28 which makes no contact with the sensor. Thus, it is necessary to cluster contact points such that all the contact points in the footprints shown in FIGS. 9a and 9c are nevertheless associated with the same footprint in spite of the discontinuities represented by the respective bridge portions 23 and 28.

Figure 10:
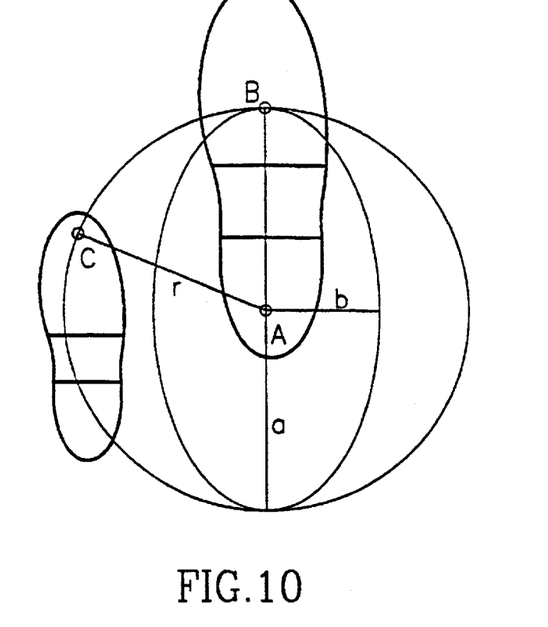
FIG. 10 illustrates schematically how clustering is performed.

FIG. 10 shows how clustering is effected. A specific contact point will be associated with a specific cluster if even a single contact point belonging to the cluster falls within an imaginary contour surrounding the specific contact point. In the first sample, all contact points are also fresh contact points $F_i$. The first contact point $F_1$ is surrounded with an imaginary contour as will be described below. Any of the contact points $F_2$, $F_3$, $F_4$ etc. which fall within the imaginary contour of the contact point $F_1$ are associated with the cluster $C_1$. Otherwise, a new cluster $C_2$ is created in respect of the first contact point which cannot be associated with the first cluster $C_1$ and this contact point also is surrounded by an imaginary contour. Any remaining unclustered fresh contact points which fall within the imaginary contour surrounding $F_2$ will be associated with the cluster $C_2$. The same procedure is repeated until all contact points $F_i$ in the current sample are associated with clusters.

In each of the subsequent samples, the first fresh contact point $F_1$ is surrounded with the imaginary contour and first checked as to whether it can be associated with an already existing cluster. If not, then it is assigned a new cluster. Likewise, any of the remaining fresh contact points are checked as to whether they can be associated with already existing clusters and, if not, they are assigned new clusters.

With firer regard to FIG. 10, it will be appreciated that the shape and dimensions of the imaginary contour are selected so that adjacent contacts points which are separated from one another owing to the design of a person's shoe are nevertheless associated with the same cluster. On the other hand, adjacent contacts points which are separated from one another but emanate from two different footprints near one another must be associated with different clusters. To this end, there may be exploited the fact that a person's foot is substantially elliptical in shape having respective major and minor axes. Specifically, the length of a person's foot is significantly greater than the width thereof. Consequently, two adjacent contact points belonging to the same footprint may be expected to lie within an elliptical contour having a major axis parallel to the major axis of the footprint and being centered on one of the contact points. Such an elliptical contour will include two displaced contact points along the length of the footprint but will exclude two contact points displaced by the same distance along the width of the footprint. By such means, the contact points A and B are associated with the same footprint; whilst the contact points A and C, which are displaced by the same distance r are associated with the different footprints.

As noted above with reference to FIG. 6 of the drawings, there must be defined a boundary extending either side of an existing footprint within which a successive footprint of the same person may reasonably be expected to fall. Such a boundary defines a path on either side of a center point of the existing footprint within which a successive footprint may be associated with the same body.

Figure 11:
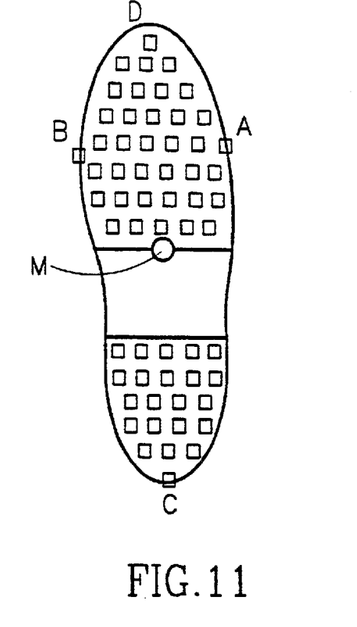
FIG. 11 shows schematically the definition of a mid-point of a maximum contact cluster according to a preferred embodiment of the invention.

FIG. 11 shows how the center point of the footprint is derived. Once a maximum contact cluster has been derived, the number of constituent contact points along its major and minor axes are determined. The mid-point along each of these axes corresponds to the center point of the footprint.

The invention has been described so far with particular reference to people's footprints which are characterized by discrete imprints each representing a successive instance of the person. However, the method according to the invention is equally well applicable to the counting of objects which do not have associated therewith discrete footprints representative of successive instances of the object. Such objects leave a continuous track across the complete length of the sensor commensurate, for example, with being rolled or dragged along the sensor.

Figure 12:
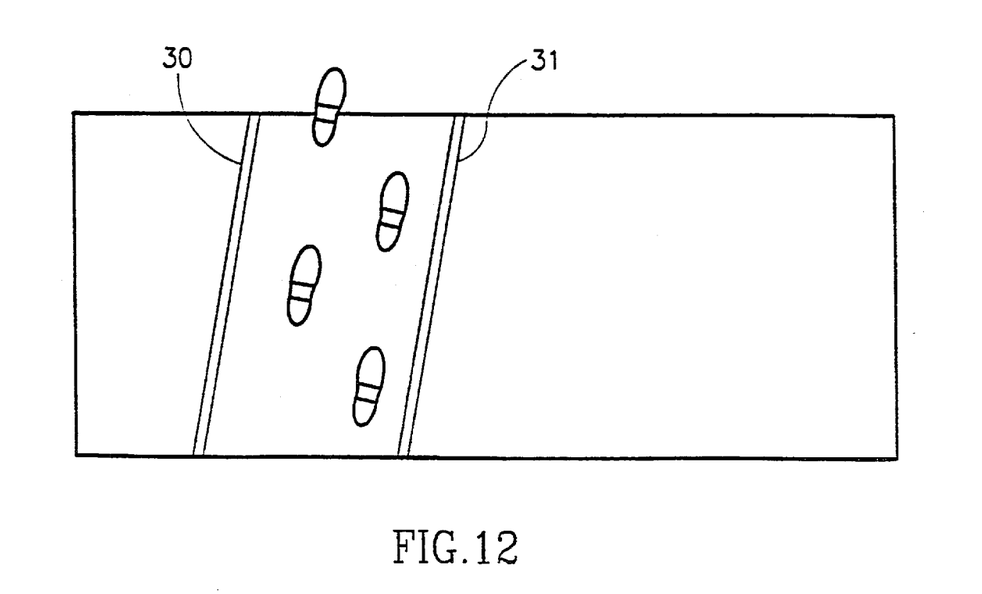
FIG. 12 illustrates how the invention may be extended to encompass objects which are wheeled or dragged across the sensor.

FIG. 12 shows schematically two pairs of parallel tracks 30 and 31 corresponding to two objects which are dragged or wheeled across the sensor. Such objects may be identified by the fact that their respective maximum contact clusters extend across a whole length of the sensor including respective dead areas at opposite extremities thereof.

Figure 13A:
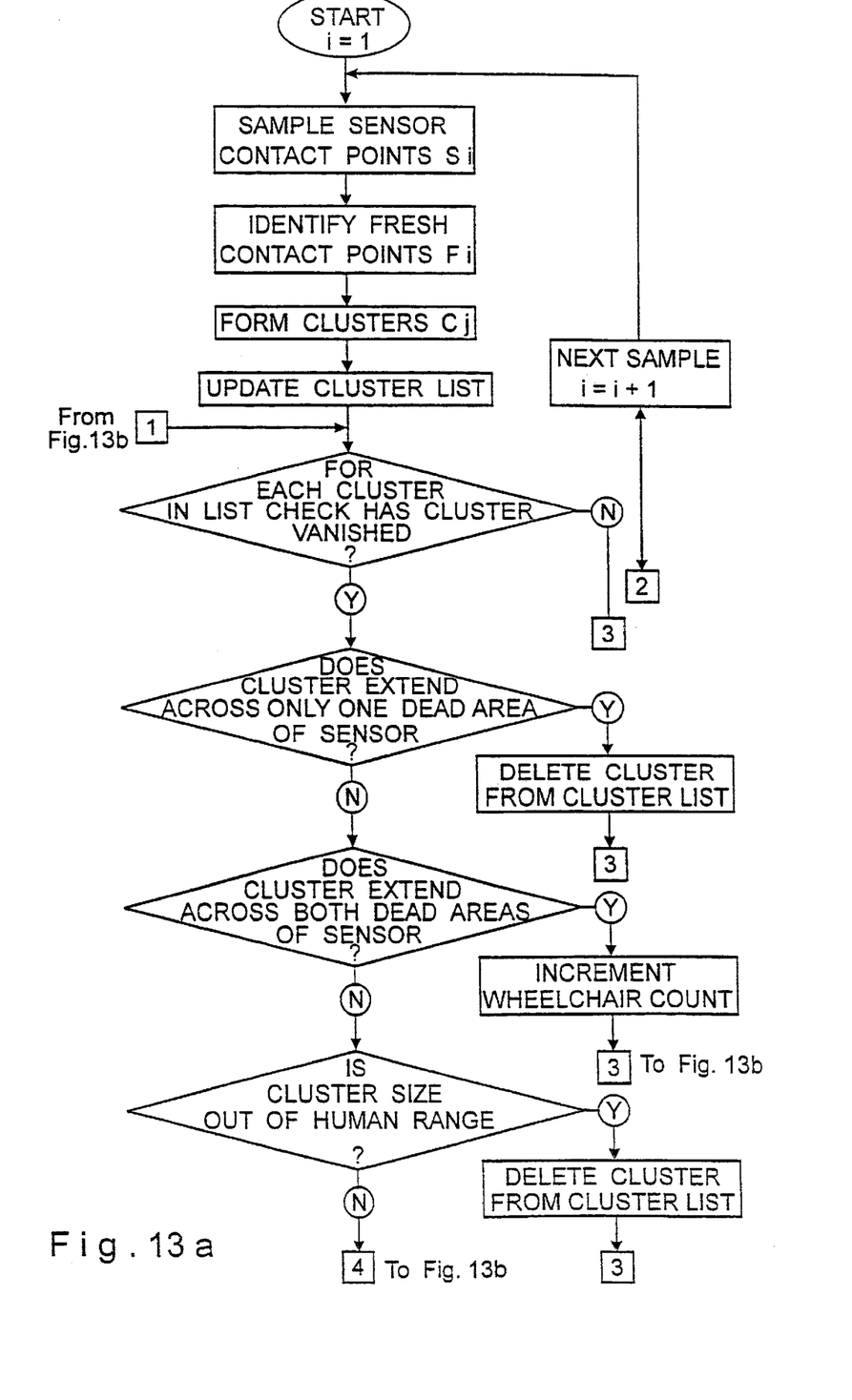
FIGS. 13a and 13b are a flow diagram showing the principal method steps according to the invention.
Figure 13B:
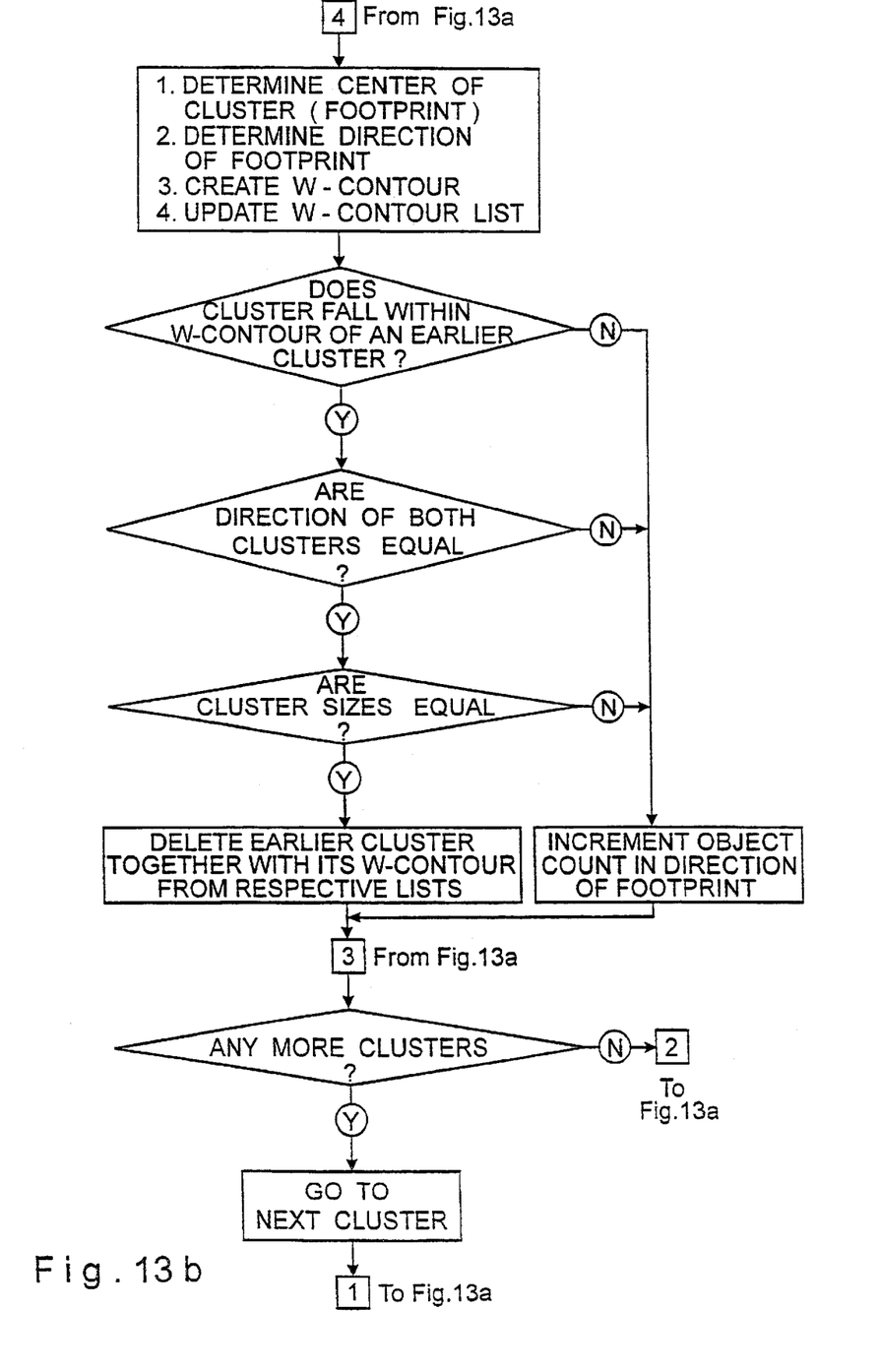

Referring to FIGS. 13a and 13b there will now be summarized the principal method steps associated with the invention. All the sensor points are sampled and "fresh" contact points $F_i$ are determined. The fresh contact points $F_i$ are then grouped into clusters $C_j$ each corresponding to a respective instance of an object. A list of clusters is maintained which is updated whenever a fresh contact point $F_i$ cannot be associated with an existing cluster thus requiring the creation of a new cluster which must be added to the cluster list.

Likewise, whenever no fresh contact points or any other contact points can be associated with an existing cluster in the list thus indicating that the footprint corresponding to the cluster has now vanished, the now vanished cluster is processed as follows.

First, a check is performed as to whether the cluster extends into only one of the "dead" areas at opposite extremities of the sensor. If so, the cluster constitutes a "partial footprint" and is deleted from the cluster list as an illegitimate footprint and the next cluster in the list is processed. Otherwise, a check is performed as to whether the cluster extends across both of the "dead" areas at opposite extremities of the sensor. If so, the cluster constitutes an object which has been dragged across the sensor or to the track of a wheeled object such as a wheelchair, perambulator, trolley etc. A separate counter is maintained of such wheeled objects (referred to generically by the term "wheelchair" in FIG. 13a) and this counter is thus incremented. Otherwise, a check is performed as to whether the cluster size is out of human range (e.g. corresponds to an animal such as a pet dog). If so, then here also the cluster is deleted from the cluster list. After either deleting an "illegal" cluster from the cluster list or incrementing the "wheelchair" counter, the next cluster in the list is processed.

Otherwise, the currently processed vanished cluster corresponds to a person's complete footprint whose center is determined as described above with reference to FIG. 11. The W-contour is created and added to the W-contour list and the time history of the cluster's contact points is scanned in order to determine the direction of evolution of the footprint across the sensor. A check is now performed as to whether the W-contour of an earlier cluster contains the vanished cluster. If so, this means that the cluster whose W-contour contains the vanished cluster might, legitimately be a previous instance of the same object corresponding to the currently processed vanished cluster. The likelihood of the two footprints deriving from the same object is now checked by confirming that the direction of travel of both footprints is the same and that their cluster sizes are equal. If so, then it is assumed that the two footprints do indeed derive from the same object. In this case, the object count should not be incremented. The previous cluster is deleted from the cluster list and its W-contour is deleted from the W-contour list. It is also to be noted that the length of the sensor is such that a person walking normally will walk from one end thereof to the other within only several seconds. Thus, bearing in mind that the method according to the invention assumes continuous dynamic motion of people across the sensor, any legal footprint which has not already been deleted is, in any case, deleted together with its corresponding W-contour after such a time interval.

If none of the above checks is affirmative, then having established that the vanished cluster is representative of a valid footprint which has no previous instance in the cluster list, the object count may now be incremented by one in the corresponding direction of passage across the sensor.

If there are more vanished clusters, then each of these is processed in like manner; otherwise, the value of i is incremented and the next sample $S_i$ is created.

It will be appreciated that whilst, in accordance with the preferred embodiment, illegal footprints are disregarded in order to enhance the accuracy of the result there may be occasions when a sufficiently accurate result may be obtained without such elimination or with only partial elimination.

It is further to be noted that the invention effectively counts only a first instance of an object's footprint. Thus, in order that an object should not be counted more than once, successive footprints are not counted. It will be noted that the elimination of successive footprints requires the definition of various criteria as to which maximum contact clusters constitute successive footprints of an object. In accordance with these criteria it is required that a successive footprint lie within the boundary of a preceding footprint, that both footprints have the same number of contact points and are iso-directional.

However, there may be occasions when a sufficiently accurate result may be obtained without applying all of these criteria. For example, there may exist situations wherein the likelihood of a non-successive footprint falling within the W-contour of a first footprint is considered so low that the size and direction criteria can safely be dispensed with. Alternatively, there may exist situations wherein the likelihood of a non-successive footprint falling within the W-contour of a first footprint and being of both equal area and direction is considered so low that one or both of the size and direction criteria can safely be dispensed with.

Other variations to the specific algorithm described within will be apparent to those skilled in the art without departing from the spirit of the invention as defined in the appended claims.

In the method claims which follow, alphabetic characters used to designate claim steps are provided for convenience only and do not imply any particular order of performing the steps.

What is claimed is:

1. A method for counting a number of objects passing through an entry threshold, the method comprising:
   (a) disposing a sensor having a matrix of sensing points in an area of the entry threshold,
   (b) identifying successive complete footprints of the same object on said sensor,
   (c) distinguishing between different footprints using clustering, and
   (d) counting the number of different footprints so as to determine the number of objects therefrom.

2. A method for counting a number of objects passing through an entry threshold, the method comprising:
   disposing a sensor having a matrix of sensing points in an area of the entry threshold, and identifying successive complete footprints of the same object on said sensor, distinguishing between different footprints using clustering;
   said method further comprising:
   (a) periodically sampling said sensing points so as to construct successive samples $S_i$ of contact points corresponding to all of the sensing points which are in contact with an object,
   (b) ignoring in each of said samples $S_i$ any points which are also present in a previous sample, $S_{i-1}$ so as to generate successive arrays $F_i$ containing only fresh contact points,
   (c) in a first sample clustering the fresh contact points $F_i$ so as to form at least one cluster $C_j$ so that each cluster $C_j$ contains a subset of contact points $F_i$ belonging to an identical object,
   (d) in subsequent samples associating each of said contact points $F_i$ with an existing cluster if possible, and if necessary creating new clusters so that all contact points $F_i$ belonging to an identical object are associated with a respective cluster $C_j$,
   (e) for any vanished cluster $C_v$ with which no contact points in the current sample $S_i$ can be associated, retroactively analyzing the cluster $C_v$ as follows:
      (i) finding a corresponding maximum contact cluster $C_m$ whose number of contact points is maximum corresponding to full contact of the respective instance of the object $O_j$ with sensor,
      (ii) disregarding any maximum contact clusters $C_m$ corresponding to footprints which may be in partial contact only with the sensor,
      (iii) for each maximum contact cluster $C_{mj}$ representative of an object $O_j$, defining a boundary $B_{mj}$ within which any other maximum contact cluster $C_{msj}$ could legitimately be a successive footprint of said object $O_j$, (iv) for each maximum contact cluster $C_{msj}$ which falls within the boundary $B_{mj}$ of the maximum contact cluster $C_{mj}$ and could thus legitimately be a successive footprint of said object $O_j$, eliminating said cluster $C_{mj}$ together with its corresponding boundary $B_{mj}$ and repeating step (i), and (v) counting a cumulative number of maximum contact clusters which were neither disregarded in step (ii) nor assumed to be successive footprints of the object $O_j$ in step (iv).

3. The method according to claim 2, wherein step (iv) further comprises the step of:

(i) determining whether the maximum contact cluster $C_{msj}$ which could legitimately be a successive footprint of said object $O_j$ has a substantially equal number of contact points as the cluster $C_{mj}$ and, if so, presuming the maximum contact cluster $C_{msj}$ to be a successive footprint of said object $O_j$.

4. The method according to claim 2, wherein step (iv) further comprises the steps of:

(ii) determining a direction of passage across said sensor for the maximum contact cluster $C_{mj}$ and for each of said maximum contact clusters $C_{ms}$, and (iii) disregarding as legitimate successive footprints of said object $O_j$ any clusters $C_{ms}$ whose direction of passage is not identical to the direction of passage of the cluster $C_{mj}$.

5. The method according to claim 3, wherein step (iv) further comprises the steps of:

(ii) determining a direction of passage across said sensor for the maximum contact cluster $C_{mj}$ and for each of said maximum contact clusters $C_{ms}$, and (iii) disregarding as legitimate successive footprints of said object $O_j$ any clusters $C_{ms}$ whose direction of passage is not identical to the direction of passage of the cluster $C_{mj}$.

6. The method according to claim 4, further including:

associating with each fresh contact point $F_i$ a time of creation $t_{fi}$, and for each fill contact cluster $C_{mj}$ representative of a footprint of the object $O_j$ determining a direction of evolution of its contact points $F_i$ so as to determine a direction of passage of said object $O_j$ across the sensor.

7. The method according to claim 5, further including:

associating with each fresh contact point $F_i$ a time of creation $t_{fi}$, and for each full contact cluster $C_{mj}$ representative of a footprint of the object $O_j$ determining a direction of evolution of its contact points $F_i$ so as to determine a direction of passage of said object $O_j$ across the sensor.

8. The method according to claim 5, for determining the number of objects traversing the sensor in a specific direction, further comprising the steps of counting a cumulative number of non-disregarded maximum contact clusters which were not assumed to be successive footprints of the object $O_j$ and whose direction of passage across the sensor is identical to said specific direction.

9. The method according to claim 2, wherein the steps (c) and (d) of clustering include the steps of:

(i) surrounding each of the fresh contact points $F_i$ with an imaginary contour, (ii) checking whether any contact point belonging to an already existing cluster $C_j$ falls within said imaginary contour:

(1) if so, associating the fresh contact point $F_i$ with said cluster;

(2) if not, assigning the fresh contact point $F_i$ a new cluster, checking whether any of the remaining fresh contact points fall within the imaginary contour and, if so, associating the remaining fresh contact point with the new cluster.

10. The method according to claim 9, wherein said contour is elliptical having a major axis in a direction of passage through the entry threshold.

11. The method according to claim 2, wherein the step of defining the boundary $B_{mj}$ includes:

(a) determining a mid-point of the maximum contact cluster, and (b) drawing a pair of imaginary lines defining said boundary each on opposite sides of the mid-point extending across the sensor and displaced from the mid-point a distance d approximately equal to an average person's foot span.

12. The method according to claim 11, wherein said imaginary lines traverse across the sensor and pointing in opposite directions away from said center line so as to form a W-shaped contour allowing for angular deviation.

13. The method according to claim 12, wherein an extent of the W-contour is sufficiently long relative to a person's stride so as to accommodate a successive footprint of the person whilst being sufficiently short to ensure that a successive footprint matching that which gave rise to the W-contour may be assumed to be a successive instance of the same person.

14. The method according to claim 2, wherein the step of eliminating illegal footprints includes disregarding any maximum contact clusters which have at least one contact point in a dead area of the sensor at either of opposite extremities thereof but which does not extend completely across the sensor.

15. The method according to claim 2, wherein the step of eliminating illegal footprints includes disregarding any maximum contact clusters whose number of constituent contact points is out of a specified range.

16. The method according to claim 2, further including the step of:

determining whether the maximum contact cluster extends across a whole length of the sensor including respective dead areas at opposite extremities thereof so as to identify an object which is dragged or wheeled across the sensor.

17. A method in accordance with claim 2 for determining a number of objects in a confined space having an entry threshold through which objects are continually passing in both directions, comprising the steps of:

(a) determining a first number of objects traversing said entry threshold in a first direction so as to enter said confined area in accordance with claim 2, (b) determining a second number of objects traversing said entry threshold in a second opposite direction so as to exit said confined area in accordance with claim 2, (c) determining the number of objects in the confined space bound the entry threshold as the difference between the number of objects entering and exiting.

* * * * *